(12) United States Patent
Mainka et al.

(10) Patent No.: US 11,926,999 B2
(45) Date of Patent: Mar. 12, 2024

(54) OUTLET FOR A WATER ARMATURE

(71) Applicant: GROHE AG, Hemer (DE)

(72) Inventors: David Mainka, Iserlohn (DE); Wulf Woesthoff, Hemer (DE); Matthias Schlüter, Dortmund (DE)

(73) Assignee: GROHE AG, Hemer (DE)

( * ) Notice: Subject to any disclaimer, the term of this patent is extended or adjusted under 35 U.S.C. 154(b) by 423 days.

(21) Appl. No.: 17/275,329

(22) PCT Filed: Sep. 13, 2019

(86) PCT No.: PCT/EP2019/074526
§ 371 (c)(1),
(2) Date: Mar. 11, 2021

(87) PCT Pub. No.: WO2020/053408
PCT Pub. Date: Mar. 19, 2020

(65) Prior Publication Data
US 2022/0049479 A1    Feb. 17, 2022

(30) Foreign Application Priority Data
Sep. 13, 2018  (DE) .................. 10 2018 007 226.7

(51) Int. Cl.
*E03C 1/04* (2006.01)
*F16L 11/22* (2006.01)

(52) U.S. Cl.
CPC ............ *E03C 1/0404* (2013.01); *F16L 11/22* (2013.01); *E03C 2001/0415* (2013.01)

(58) Field of Classification Search
CPC .................................................... E03C 1/0404
USPC ............................................................ 4/678
See application file for complete search history.

(56) References Cited

U.S. PATENT DOCUMENTS

| 2018/0209571 A1* | 7/2018 | Stein ................. E03C 1/084 |
| 2019/0032309 A1* | 1/2019 | Stein ................. E03C 1/0404 |
| 2021/0388582 A1* | 12/2021 | Currey ............... E03C 1/0403 |

FOREIGN PATENT DOCUMENTS

| DE | 103 17 753 | 7/2004 |
| DE | 10 2016 000 766 | 7/2017 |
| DE | 10 2017 101 566 | 6/2018 |
| WO | 2007/113663 | 10/2007 |
| WO | 2017/123087 | 7/2017 |

OTHER PUBLICATIONS

International Search Report dated Dec. 5, 2019, in International (PCT) Application No. PCT/EP2019/074526.

* cited by examiner

*Primary Examiner* — Huyen D Le
(74) *Attorney, Agent, or Firm* — Wenderoth, Lind & Ponack, L.L.P.

(57) ABSTRACT

The invention relates to an outlet (1) for a water armature (2) having an inlet region (3) and an outlet region (4), wherein a tube (5) extends through the outlet body (6) from the inlet region (3) to the outlet region (4), and wherein at least three fluid channels (7, 8, 9) which run parallel to one another and separate from one another are formed in the tube (5).

10 Claims, 9 Drawing Sheets

OUTLET FOR A WATER ARMATURE

Figure 1:
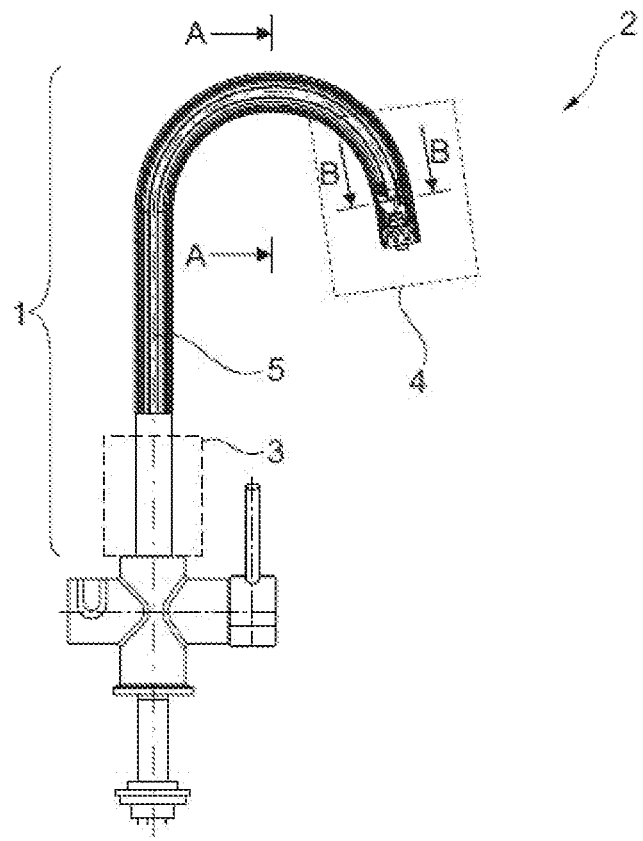

The invention relates to an outlet for a water armature, a water armature, a method for the production of an outlet for a water armature, and the use of a tube.

It is known to form up to two separate water paths in one outlet of a water armature with at least one tube. There are, in principle, two options for this purpose. On the one hand, two tubes, which each form only one water path, can run adjacent to one another through a body of the outlet. On the other hand, a single tube that surrounds only one water path can be arranged in the body of the outlet such that said outlet is surrounded by a second water path. In the latter case, a bypass flow flows around the tube.

If more than two separate waterways are to be formed through an outlet of a water path, the following problems result with the known options. On the one hand, the outlet has to be significantly wider in diameter, which, however, would be disadvantageous, in particular with respect to current design requirements (great degree of design freedom) and due to increased material costs. On the other hand, assembly would be significantly more costly, in particular, because several tubes would have to be drawn into the outlet for both options.

On this basis, the object of the present invention is to at least partially solve the problems described in relation to the prior art. In particular, an outlet for a water armature, a water armature, a method for the production of a water armature, and a use of a tube are to be indicated, which at least contribute to being able to conduct more than two fluid flows separately from one another through an outlet of a water armature while also providing the greatest possible design freedom for the outlet. Moreover, the material costs for the outlet should be kept as low as possible and/or the production or assembly of the outlet should be as simple as possible.

These objects are solved by the features of the independent patent claims. Further advantageous embodiments of the solution proposed here are indicated in the dependent patent claims. It should be pointed out that the features listed individually in the dependent patent claims can be combined in any technologically useful manner and define further embodiments of the invention. Furthermore, the features indicated in the patent claims are specified and explained in more detail in the description, while further preferred embodiments of the invention are shown.

An outlet for a water armature contributes to this purpose with an inlet region and an outlet region, wherein a tube extends from the inlet region to the outlet region through an outlet body and wherein at least three fluid channels are formed which run parallel to one another and separate from one another.

The solution proposed here contributes in an advantageous manner to more than two fluid flows being able to be conducted separate from one another through an outlet of a water armature. Particularly advantageous in this context is that, based on the configuration of the tube with at least three fluid channels that run parallel to one another and separately from one another proposed here, a comparatively high degree of design freedom of the outlet can be made possible. In this context, the configuration of the tube contributes in particular to a comparatively small outer diameter of the outlet. Furthermore, through the use of (only) one (single) tube and the comparatively small outer diameter of the outlet, the material costs for the outlet can be kept low. Moreover, the production or assembly of the outlet can be kept as simple as possible, in particular because only one tube must be introduced into the outlet body.

The inlet region can extend, for example, up to 10 cm along the outlet body, starting from one inlet cross-section of the outlet body (at one of the end faces or end surfaces of the outlet). The outlet region may extend (back), for example, up to 10 cm along the outlet body, starting from one outlet cross-section of the outlet body (at the other of the end faces or end surfaces of the outlet body).

The outlet has one (single) tube. The tube extends through the outlet body from the inlet region to the outlet region. Usually, one single tube or only one tube extends through the outlet body. Preferably, the tube extends at least from one end of the inlet region to a beginning of the outlet region. Furthermore, the tube extends preferably through the outlet body in such a way that fluid conducted through the fluid channels does not wet the outlet body, in particular not an inner surface of the outlet body. In particular, the tube is a multi-lumen tube or multi-lumen tube with at least three lumens.

Usually, the tube is elongated (its length is significantly larger than its diameter). Preferably, the tube is formed in one piece or one part. The tube is preferably formed with one of the following materials or a combination thereof: silicone, LLDPE or comparable materials.

Silicone or comparable materials, which usually meet requirements for food, are particularly preferred. These materials should preferably be able to be used in a temperature range from 4° C. to +100° C. and/or in comparison be watertight to gas, such as $CO_2$. For water enriched with $CO_2$, the material LLDPE (Linear Low-Density Poly-Ethylene) can preferably also or alternatively be used. This material can usually be used for a temperature range from −30° C. to +65° C. and advantageously is already approved for the food industry. Silicone tubes usually have (depending on material composition) a range of use from −100° C. to +300° C. This material is currently also used, in particular, in the household appliance industry (drink dispensers, coffee machine, electric irons, etc.) for conducting fluids. A further advantage consists in the fact that this material is already approved for the food industry, drinking water applications and sanitary applications.

The outlet also has an outlet body. The outlet body preferably has a round, in particular circular outer contour and/or cross-sectional shape (in cross-section). Furthermore, the outlet body preferably has a round, in particular circular inner contour (in cross-section). The outlet body is preferably formed in one piece or one part. The outlet body is preferably formed from one of the following materials or a combination thereof: plastic, zinc, brass.

The outlet body can also be produced with respect to materials, for example, from various materials. For example, this can be a combination of a plastic water conduit (for example, with HDPE: High-Density Poly-Ethylene; PPSU: Polyphenylene sulfone) and a material including these (for example, die-cast zinc material). Alternatively, or cumulatively, brass can also be used.

Preferably, the outlet body is produced with a (plastic) injection molding method or a (zinc) die-cast method. Since the fluid channels are formed with the tube, a material can be used for the outlet body in an advantageous manner that does not necessarily have to satisfy the high requirements that are placed on materials for water-conducting surfaces.

At least three fluid channels that run parallel to one another and separate from one another are formed in the tube. In other words, this means, in particular, that the fluid channels are separate from one another and run through the tube parallel to one another or extend through the material of the tube parallel to one another. Preferably, the tube cross-section surface between the fluid channels and/or outside the fluid channels is completely filled with the material of the tube. In this context, the tube cross-section area relates, in particular, to a cross-sectional plane that is perpendicular to a center line of the tube. At least three, four, or even five fluid channels that run parallel to one another and separate from one another are preferably formed in the tube.

The fluid channels preferably extend at least in sections, in particular, they preferably extend completely through the tube. Usually, the fluid channels extend from one of the end faces or end surfaces of the tube to the other end face or end surface of the tube. Furthermore, the fluid channels are normally closed on the circumference. In other words, this means, in particular, that a fluid flow cannot leave the respective fluid channel between the two end faces or end surfaces of the tube, in particular not in the radial direction.

According to one advantageous embodiment, it is proposed that at least two of the fluid channels extend along a common separating wall. Preferably, (immediately) adjacent fluid channels always extend along a common separating wall. In particular, at least one web can be formed in the tube to separate the fluid channels. In this context, the web can, for example, form a common separating wall. The web or the separating wall are preferably aligned radially. Alternatively, or cumulatively, a common separating wall can have an arcuate cross-sectional shape. The cross-sectional shape relates in this context, in particular, to a cross-sectional plane that is perpendicular to a center line of the tube.

Preferably, at least one of the fluid channels has a round, in particular circular, cross-sectional shape. In this context, the cross-sectional shape relates, in particular, to a cross-sectional plane that is perpendicular to a center line of the tube. The most preferable is that at least two or even three of the fluid channels have a round, in particular circular, cross-sectional shape.

Furthermore, at least one of the fluid channels preferably has a cross-sectional shape of a ring sector, in particular of a circular ring sector. The cross-sectional shape relates in this context, in particular, to a cross-sectional plane that is perpendicular to a center line of the tube. The most preferable is that at least two or even three of the fluid channels have the cross-sectional shape of a ring sector, in particular of a circular ring sector.

According to one advantageous embodiment, it is proposed that at least two of the fluid channels are arranged so to be distributed over a circumference of the tube (or spaced at a distance from one another along the circumference). In other words, this means, in particular, that at least two of the fluid channels are arranged one behind the other and at a distance from one another in the peripheral direction of the tube. Preferably, the at least three fluid channels are arranged so as to be distributed over the circumference of the tube, in particular evenly arranged.

According to a further advantageous embodiment, it is proposed that at least two of the fluid channels are arranged radially one after another. In other words, this means, in particular, that at least two of the fluid channels are successively arranged along a radial direction. The radius relates in this context, in particular, to a center line of the tube. The most preferable is that, at least three of the fluid channels are arranged radially one behind the other.

According to one advantageous embodiment, it is proposed that at least one connecting piece be arranged in the inlet region or the outlet region. Preferably, a connecting piece is arranged at least in the outlet region. The connecting piece can be formed as a cylinder (i.e., its length is greater than its diameter) or as a plate (i.e., its diameter is greater than its length). At least three fluid paths are formed in the connecting piece that pass through the connecting piece. In particular, the fluid paths lead from a first end face or end surface to a second end face or end surface of the connecting piece. Preferably, each of the fluid paths is assigned (specifically) to one of the three fluid channels.

According to an advantageous embodiment, it is proposed that at least one transition piece is arranged between the tube and the connecting piece. The transition piece can be configured to be partially inserted, in particular plugged into one of the fluid channels of the tube and/or into one of the fluid paths of the connecting piece. For example, the transition piece is able to be inserted or is inserted with a first end into one of the fluid channels of the tube and with a second end of the fluid paths of the connecting piece. In this context, the first end and the second end of the transition piece are arranged in particular opposite one another and facing away from one another.

A fluid path usually extends through the transition piece. Here, the fluid path extends in particular from the first end (from a first end face or end surface) to the second end (of a second end face or end surface) of the transition piece. The transition piece can have an outer shape that is conical, at least in sections. Alternatively, or cumulatively, the fluid path through the transition piece can be formed, at least in sections, conically. In particular, a cross-section of the fluid path that can be flowed through can taper or expand at least in sections (continuously). A change of the cross-section of the fluid path through the transition piece that can be flowed through can advantageously contribute to influencing the fluid flow at the end of a fluid channel, in particular to slowing or accelerating the flow velocity.

According to one advantageous embodiment, it is proposed that at least two transition pieces are arranged adjacent to one another between the tube and the connecting piece. Usually, the transition pieces are arranged adjacent to one another here in a cross-sectional area. In this context, the cross-sectional area relates, in particular, to a cross-sectional plane that is perpendicular to a center line of the tube and/or the connecting piece. At least three transition pieces are preferably arranged adjacent to one another between the tube and the connecting piece. Preferably, each of the transition pieces is assigned to one (specific) of the three fluid channels of the tube. In other words, this means, in particular, that each of the fluid channels can have its (own) transition piece assigned to it.

Usually, a fluid path extends through each of the transition pieces. At least one of the transition pieces preferably has a cross-section of the fluid path through the transition piece that can be flowed through, which differs from a cross-section of the fluid path through which another of the transition pieces can flow. In other words, this means, in particular, that at least one of the transition pieces has an inner contour that is different from the inner contour of another of the transition pieces. Preferably, at least one of the transition pieces has a change in the flowable cross-section of the fluid path through the transition piece, which differs from a change in the flowable cross-section of the fluid path through another of the transition pieces. This advantageously allows the transition pieces to be able to influence the fluid flows differently.

Furthermore, the tube can be marked, for example, with a marking (recognizable from the outside) in order to advantageously enable the channels in the interior to be assigned to other components (for example, connecting pieces, threaded connections). This marking can comprise, for example, a marker thread and/or at least a thickening in the shape of a dot on the inlet side and/or outlet side of the tube. In particular, the marking can be used to avoid confusing the channels.

According to a further aspect, a water armature is proposed comprising an outlet as proposed here. The water armature can be, for example, a sink armature, a kitchen armature or a washbasin. Preferably, the water armature further has a mixing device for mixing cold water and hot water. The outlet is usually mounted on an outlet side of the mixing device. Moreover, the tube introduced here can also be used together with a water armature with a removable sprayer or in case of a pull-out variant of a water armature.

According to a further aspect, a method for producing an outlet for a water armature is proposed comprising at least the following steps:
 a) Providing an outlet body,
 b) Providing a tube in which at least three fluid channels are formed which run parallel to one another and are separate from one another,
 c) Introducing the tube into the outlet body.

The indicated sequence of the steps a), b) and c) usually applies in a regular operational process. Moreover, the steps a), b) and c), in particular the steps a) and b), can be carried out at least in part in parallel or even simultaneously. This is preferably used to produce an outlet for a water armature proposed here. The tube is preferably drawn in or into the outlet body in step c).

According to a further aspect, use of a tube is proposed in which at least three fluid channels that run parallel to one another and separate from one another are formed for separately conducting fluid flows through an outlet of a water armature. The tube is preferably used for separately conducting at least three fluids (or media) and/or three fluid flows through an outlet of a water armature. At least two of the three fluids or fluid flows can differ from one another in this context, in particular with respect to their temperature and/or their gas content, such as carbon dioxide content or their flow velocity.

The details, features and advantageous embodiments discussed in connection with the outlet can also occur correspondingly in the case of the water armature, the method and/or the use introduced here, and vice-versa. To this extent, reference is made comprehensively to the statements made there to characterize the features in more detail.

Figure 2:
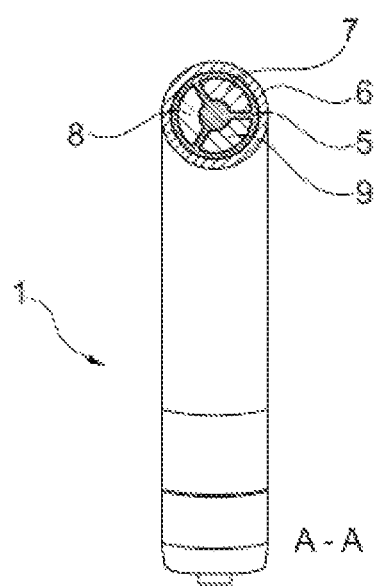
Figure 3:
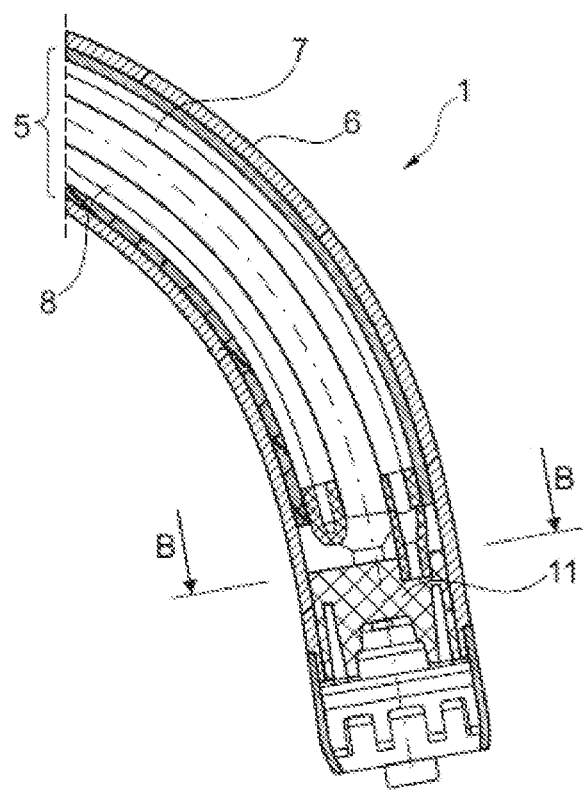
Figure 4:
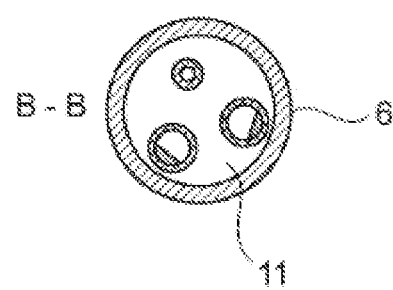

The solution introduced here and its technical setting will be explained in more detail in the following using the figures. It should be pointed out that the invention should not be limited to the embodiments. In particular, unless explicitly stated otherwise, it is also possible to extract partial aspects of the facts explained in the figures and to combine them with other components and/or knowledge from other figures and/or the present description. Shown are:

FIG. 1: an exemplary embodiment of a water armature proposed here,

FIG. 2: a sectional, detailed view of the embodiment according to FIG. 1,

FIG. 3: a further sectional, detailed view of the embodiment according to FIG. 1, FIG. 4: a further sectional, detailed view of the embodiment according to FIG. 1, FIG. 5a-e: exemplary embodiments of a tube, as it may be used in the outlet proposed here, each in a front view.

Figure 5:
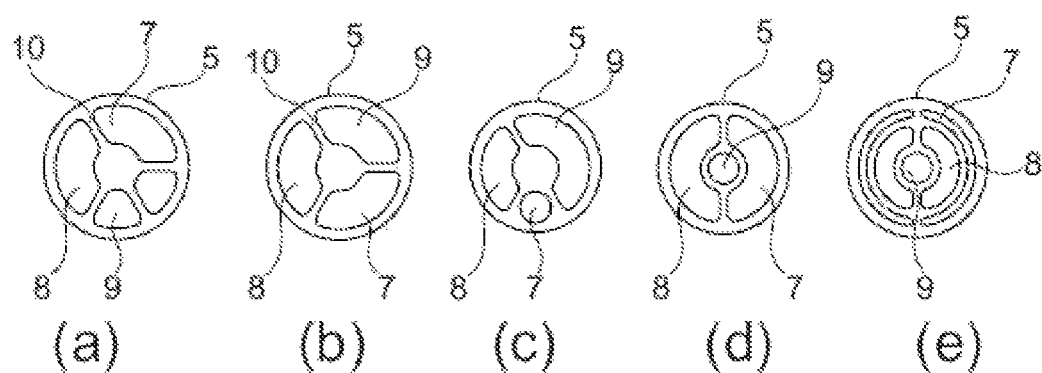
Figure 6:
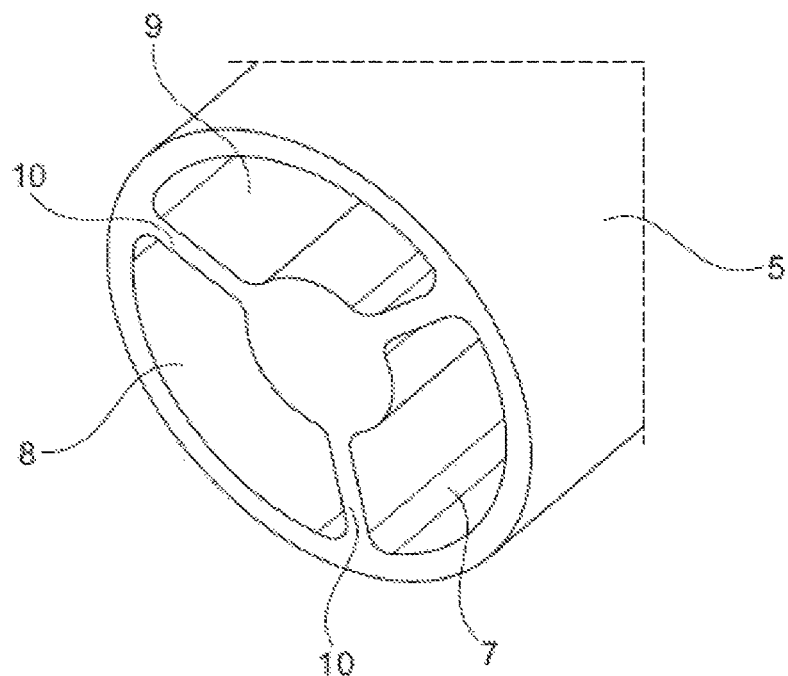
Figure 7:
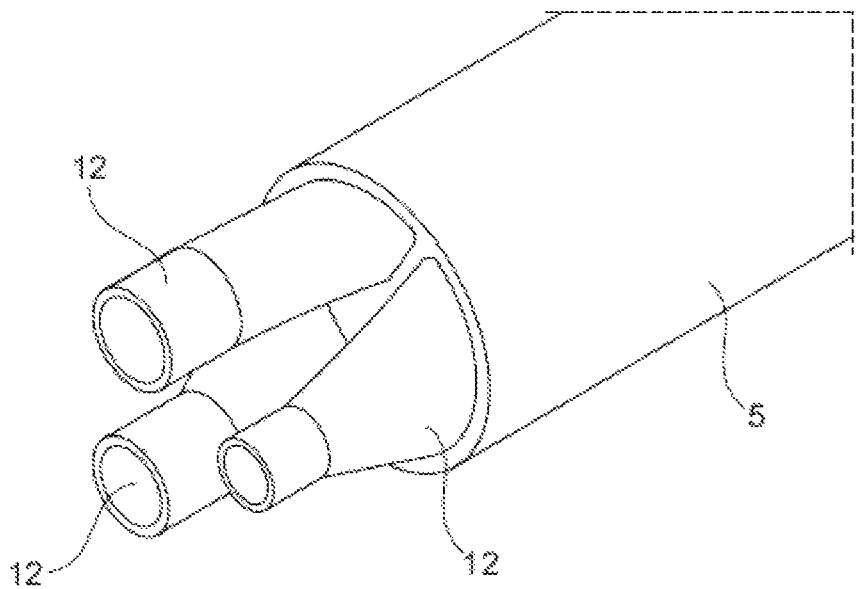
Figure 8:
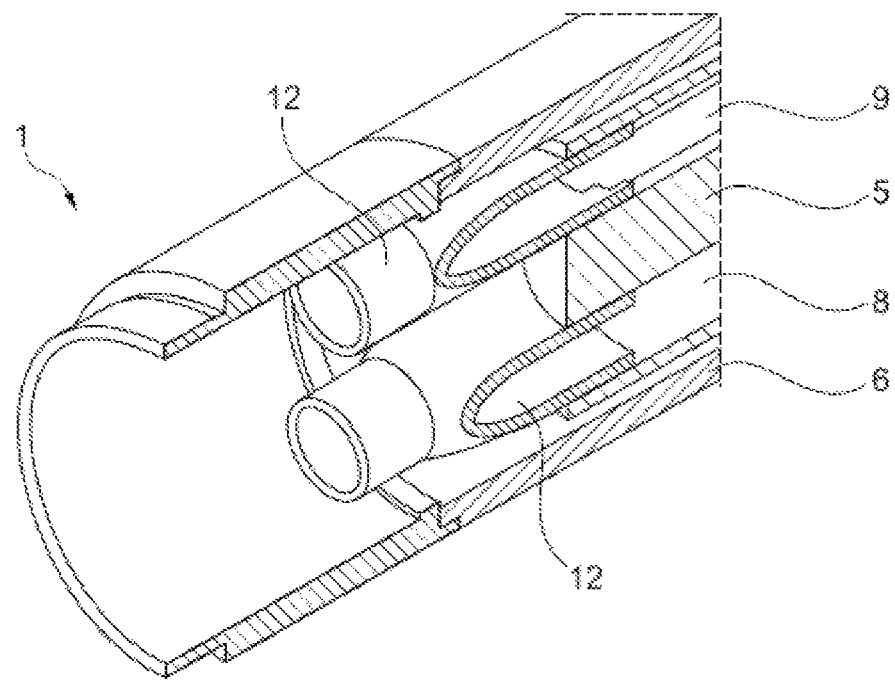
Figure 9:
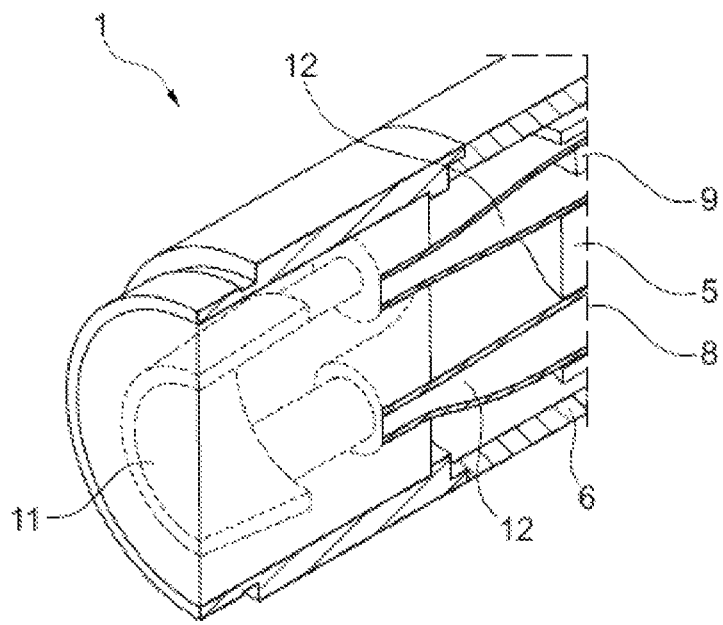
Figure 10:
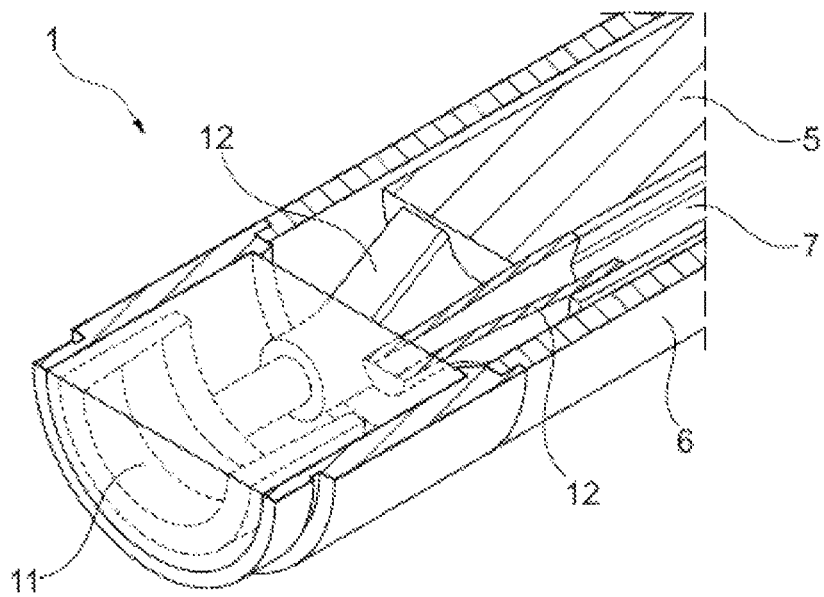
Figure 11:
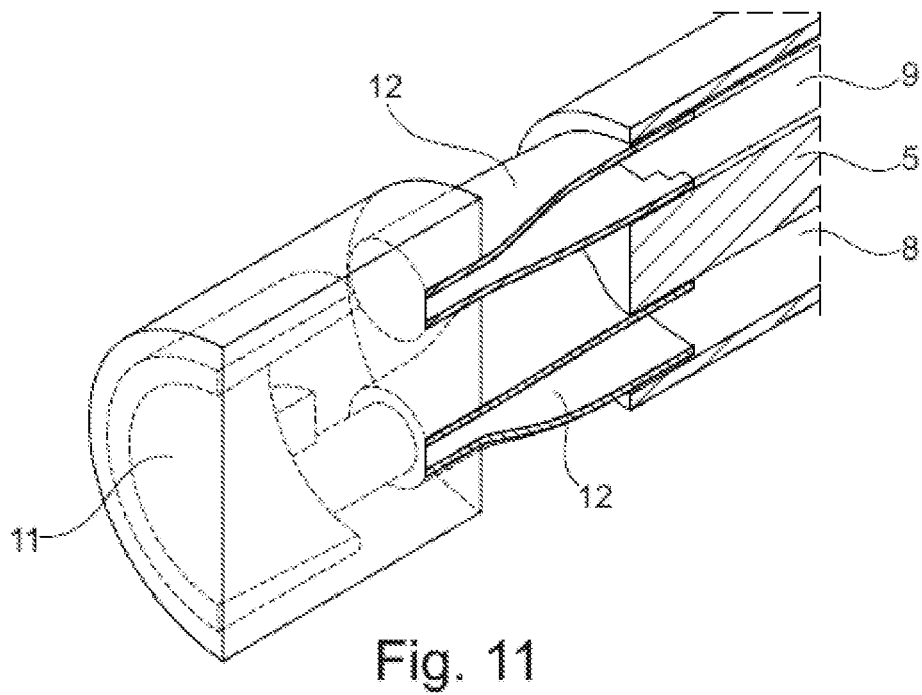
Figure 12:
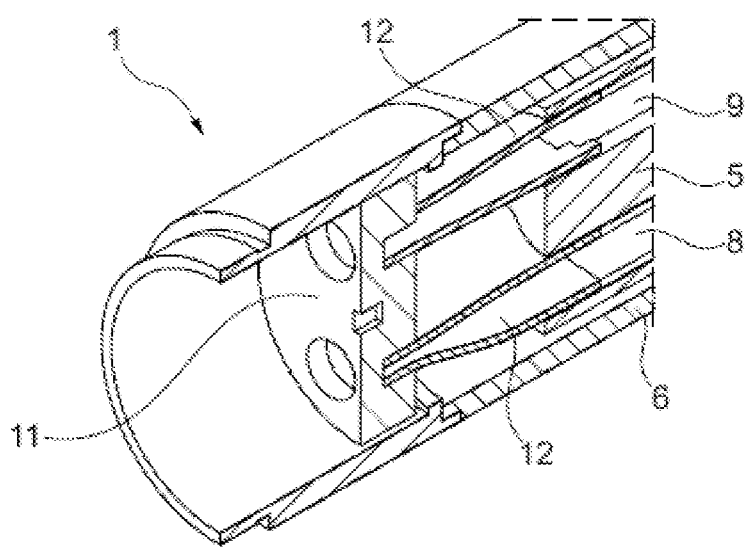
Figure 13:
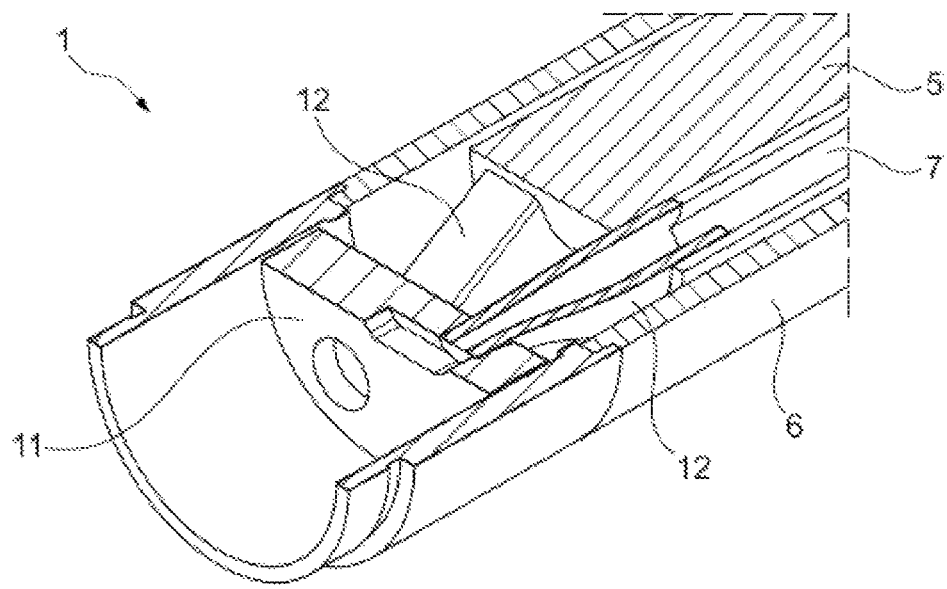
Figure 14:
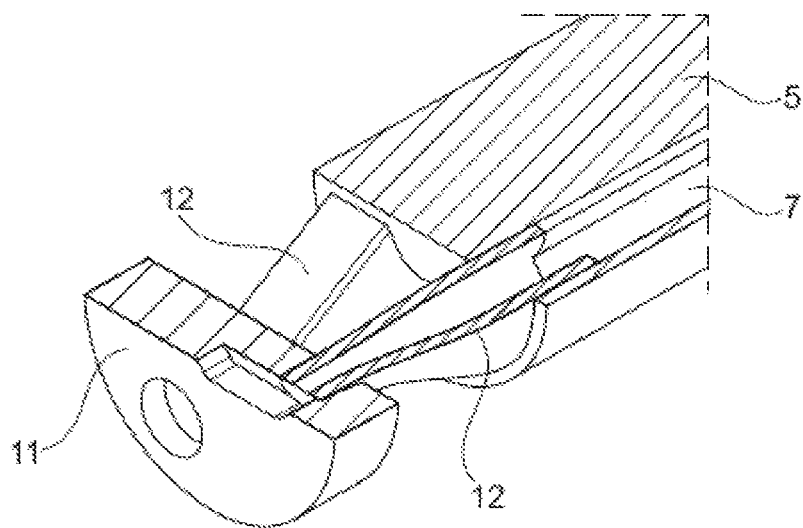
Figure 15:
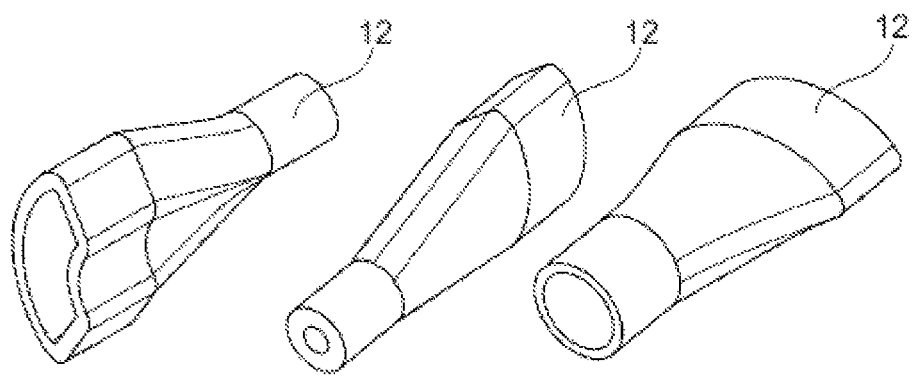
Figure 16:
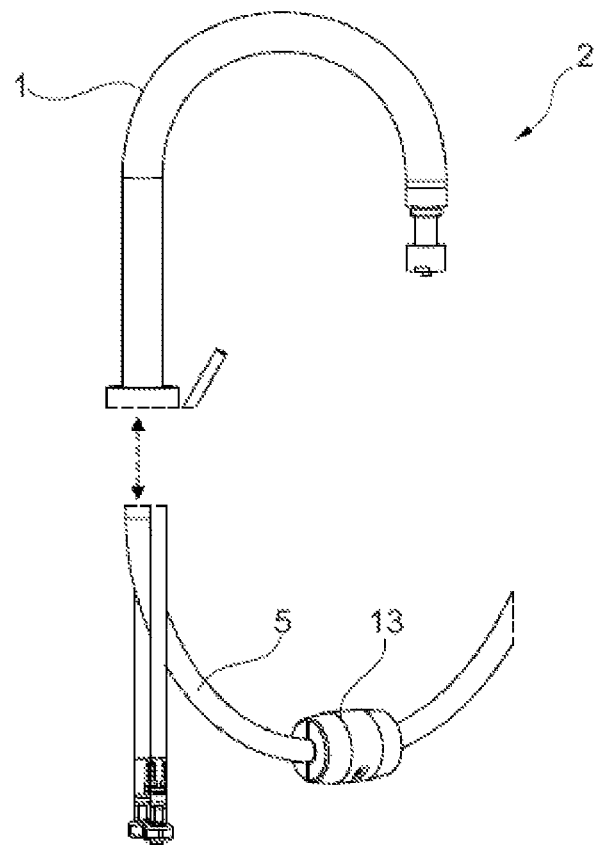
Figure 17:
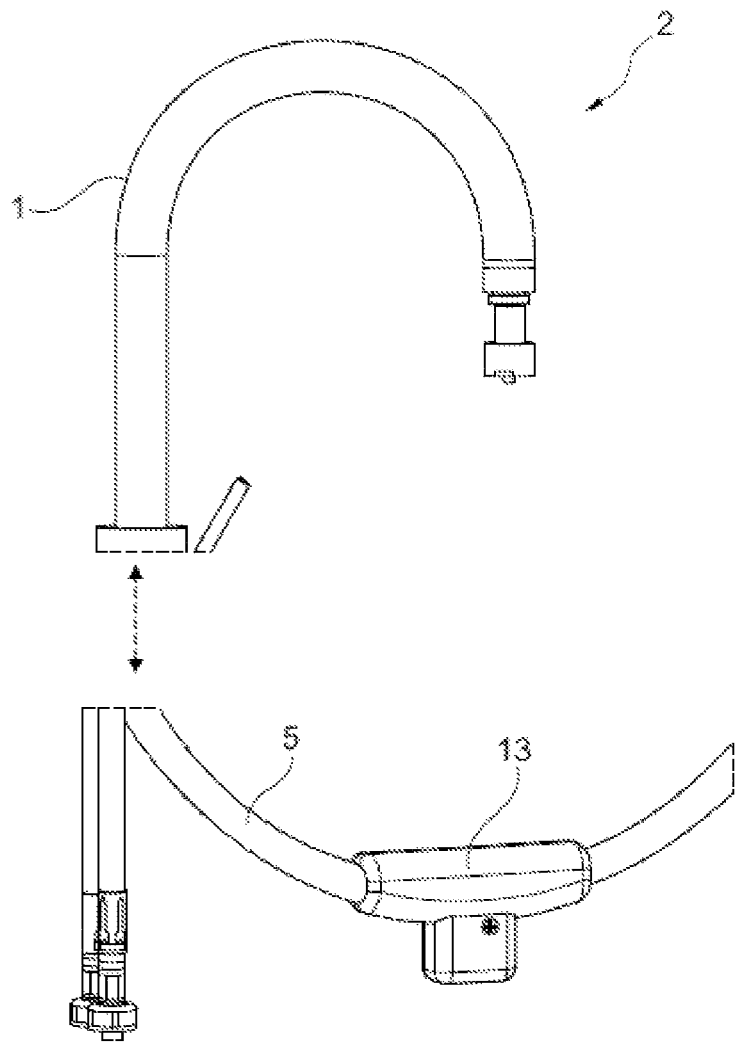
Figure 18:
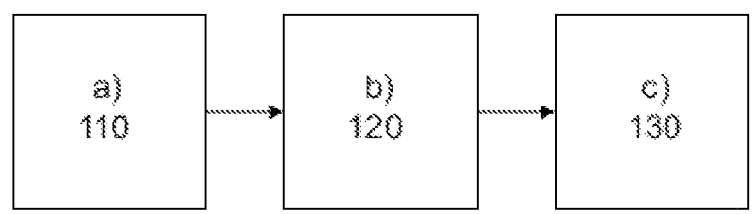

FIG. 6: a perspective view of the tube, according to FIG. 5b,

FIG. 7: a further perspective view of the tube according to FIG. 5b,

FIG. 8: a sectional, detailed view of an exemplary embodiment of the outlet proposed here, FIG. 9: a sectional, detailed view of a further exemplary embodiment of an outlet proposed here, FIG. 10: a further sectional, detailed view of the embodiment according to FIG. 9, FIG. 11: a further sectional, detailed view of the embodiment according to FIG. 9, FIG. 12: a sectional, detailed view of a further exemplary embodiment of an outlet proposed here, FIG. 13: a further sectional, detailed view of the embodiment according to FIG. 12, FIG. 14: a further sectional, detailed view of the embodiment according to FIG. 12, FIG. 15: exemplary embodiments of a transition piece, as it can be applied in the outlet proposed here, FIG. 16: a further exemplary embodiment of a water armature proposed here, FIG. 17: a further exemplary embodiment of a water armature proposed here, and FIG. 18: a sequence of a method proposed here.

FIG. 1 shows in a schematic view an exemplary embodiment of a water armature 2 proposed here. The water armature 2 has an outlet 1 proposed here.

The outlet 1 has an inlet region 3 and an outlet region 4. A tube 5 extends through the outlet body 6 of the outlet 1 from the inlet region 3 to the outlet region 4. Three fluid channels 7, 8, 9 which run parallel to one another and separate from one another are formed in the tube 5.

FIG. 2 shows in a schematic view a sectional, detailed view of an embodiment according to FIG. 1. The sectional view according to FIG. 2 is named Section A-A in FIG. 1. The reference numerals are used uniformly, so that comprehensive reference can be made to previous statements, in particular in FIG. 1.

FIG. 3 shows in a schematic view a further sectional, detailed view of the embodiment according to FIG. 1. The reference numerals are used uniformly, so that comprehensive reference can be made to previous statements, in particular in FIG. 1. According to the representation in FIG. 3, it can be seen that a connecting piece 11 is arranged in the outlet region 4 (not shown here, see FIG. 1).

FIG. 4 shows in a schematic view a further sectional, detailed view of the embodiment according to FIG. 1. The sectional view in FIG. 4 is named Section A-A in FIG. 1 and in FIG. 3. The reference numerals are used uniformly, so that comprehensive reference can be made to previous statements, in particular in FIG. 1.

FIG. 5a-e shows in a schematic view exemplary embodiment of a tube 5, as it can be applied in the outlet proposed here, each in a front view. The reference numerals are used uniformly, so that comprehensive reference can be made to previous statements, in particular in FIG. 1.

According to the view shown in FIG. 5, it can be seen that at least two of the fluid channels 6, 7, 8 can extend along a common separating wall 10. FIG. 5a-e show that by way of example and how at least two of the fluid channels 7, 8, 9 can be arranged so as to be distributed over a circumference of the tube 5. FIGS. 5d and 5e show that by way of example and how at least two of the fluid channels 7, 8, 9 can be arranged radially one after another.

FIG. 6 shows in a schematic view a perspective view of the tube 5 according to FIG. 5b. The reference numerals are used uniformly, so that comprehensive reference can be made to previous statements.

FIG. 7 shows in a schematic view a perspective view of the tube 5 according to FIG. 5b. The reference numerals are used uniformly, so that comprehensive reference can be made to previous statements. The view in FIG. 7 shows that by way of example and how a transition piece 12 can be associated with each of the fluid channels.

FIG. 8 shows in a schematic view a sectional, detailed view of an exemplary embodiment of an outlet 1 proposed here. The reference numerals are used uniformly, so that comprehensive reference can be made to previous statements. It can be seen that the outlet body 6 can also be built in several parts.

FIG. 9 shows in a schematic view a sectional, detailed view of a further exemplary embodiment of an outlet proposed here 1. The reference numerals are used uniformly, so that comprehensive reference can be made to previous statements. In FIG. 9, among other things, a connecting piece 11 is shown in shape of a cylinder. Furthermore, FIG. 9 shows that between the tube 5 and the connecting piece 11 at least two transition pieces 12 can be arranged adjacent to one another. FIG. 10 shows in a schematic view a further sectional, detailed view of the embodiment according to FIG. 9. FIG. 11 shows in a schematic view a further sectional, detailed view of the embodiment according to FIG. 9. In the view according to FIG. 11, the outlet body 6 is hidden.

FIG. 12 shows in a schematic view a sectional, detailed view of a further exemplary embodiment of an outlet 1 proposed here. The reference numerals are used uniformly, so that comprehensive reference can be made to previous statements. In FIG. 9, a connecting piece 11 is shown in the shape of a plate. FIG. 13 shows a schematic view of a further sectional, detailed view of the embodiment according to FIG. 12. FIG. 14 shows a schematic view of a further sectional, detailed view of the embodiment according to FIG. 12. In the view according to FIG. 14, the outlet body 6 is hidden.

FIG. 15 shows in a schematic view embodiment of a transition piece 12, as it can be applied in the outlet proposed here. In this context, FIG. 15 shows three exemplary embodiments of the transition piece 12. It can be seen that, in particular, the inner contours of the transition pieces 12 can be formed differently.

FIG. 16 shows in a schematic view a further exemplary embodiment of a water armature 2 proposed here. The reference numerals are used uniformly, so that comprehensive reference can be made to previous statements.

FIG. 16 shows by way of example that the tube 5 shown here and also referred to here in particular as a multi-lumen case can also be used in connection with a removable sprayer or with a pull-out variant. For this purpose, it can be fitted with a jacket (not shown here), which can contribute to a mobility of the tube 5 in the outlet 1 of the water armature 2. The jacket can be formed, for example, with a stainless-steel mesh or fiber optic threads. To advantageously make moving that back into the original state (retracted sprayer) possible, a weight 13 can be mounted at the lowest point of the looping. This can, for example, be a lead weight or a plastic component, optionally with a weight.

FIG. 17 shows in a schematic view a further exemplary embodiment of a water armature proposed here 2. The reference numerals are used uniformly, so that comprehensive reference can be made to previous statements.

FIG. 17 also shows a possible application of the design introduced here with a removable sprayer or with a pull-out variant. The variant according to FIG. 17 is different from the one in FIG. 16, in particular in that the weight 13 in FIG. 17 also forms a marking 14, in order to assign the interior channels 7, 8, 9 of tube 5, which cannot be seen here, to further components (for example, connecting pieces, threaded connections) possible.

FIG. 18 shows a schematic view of a sequence of a method proposed here. The method aids in the production of an outlet for a water armature. The series of the method steps a), b) and c) shown with the blocks 110, 120 and 130 usually results from a regular operational sequence. Moreover, the steps a), b) and c), in particular the steps a) and b), can also be carried out at least partially in parallel or even simultaneously. In block 110, an outlet body is provided. In view 120, a tube is provided in which at least three channels are formed that run parallel to one another and separate from one another. In block 130, the tube is introduced into the outlet body.

LIST OF REFERENCE NUMERALS

1 Outlet
2 Water armature
3 Inlet region
4 Outlet region
5 Tube
6 Outlet body
7 Fluid channel
8 Fluid channel
9 Fluid channel
10 Separating wall
11 Connecting piece
12 Transition piece
13 Weight
14 Marking

The invention claimed is:

1. An outlet (1) for a water armature (2) having an inlet region (3) and an outlet region (4), wherein a single tube (5) extends through an outlet body (6) from the inlet region (3) to the outlet region and wherein at least three fluid channels (7, 8, 9) are formed in the single tube (5) that run parallel to one another and are separate from one another.

2. The outlet according to claim 1, wherein at least two of the fluid channels (6, 7, 8) extend along a common separating wall (10).

3. The outlet according to claim 1, wherein at least two of the fluid channels (7, 8, 9) are arranged so as to be distributed across an extent of the single tube (5).

4. The outlet according to claim 1, wherein at least two of the fluid channels (7, 8, 9) are arranged radially one after another.

5. The outlet according to claim 1, wherein at least one connecting piece (11) is arranged in the inlet region (3) or the outlet region (4).

6. The outlet according to claim 5, wherein at least one transition piece (12) is arranged between the single tube (5) and the connecting piece (11).

7. The outlet according to claim 5, wherein at least two transition pieces (12) are arranged adjacent to one another between the single tube (5) and the connecting piece (11).

8. A water armature (2) comprising the outlet (1) according to claim 1.

9. A method for producing an outlet (1) for a water armature (2) comprising at least the following steps:
   a) providing an outlet body (6),
   b) providing a single tube (5), in which at least three fluid channels (7, 8, 9) are formed that run parallel to one another and are separate from one another, and
   c) introducing the single tube (5) into the outlet body (5).

10. A method of separately conducting fluid flows through an outlet (1) of a water armature (2), comprising providing a single tube (5) in which at least three fluid channels (7, 8, 9) are formed that run parallel to one another and are separate from one another, and separately conducting fluid flows through the single tube (5).

\* \* \* \* \*